UNITED STATES PATENT OFFICE.

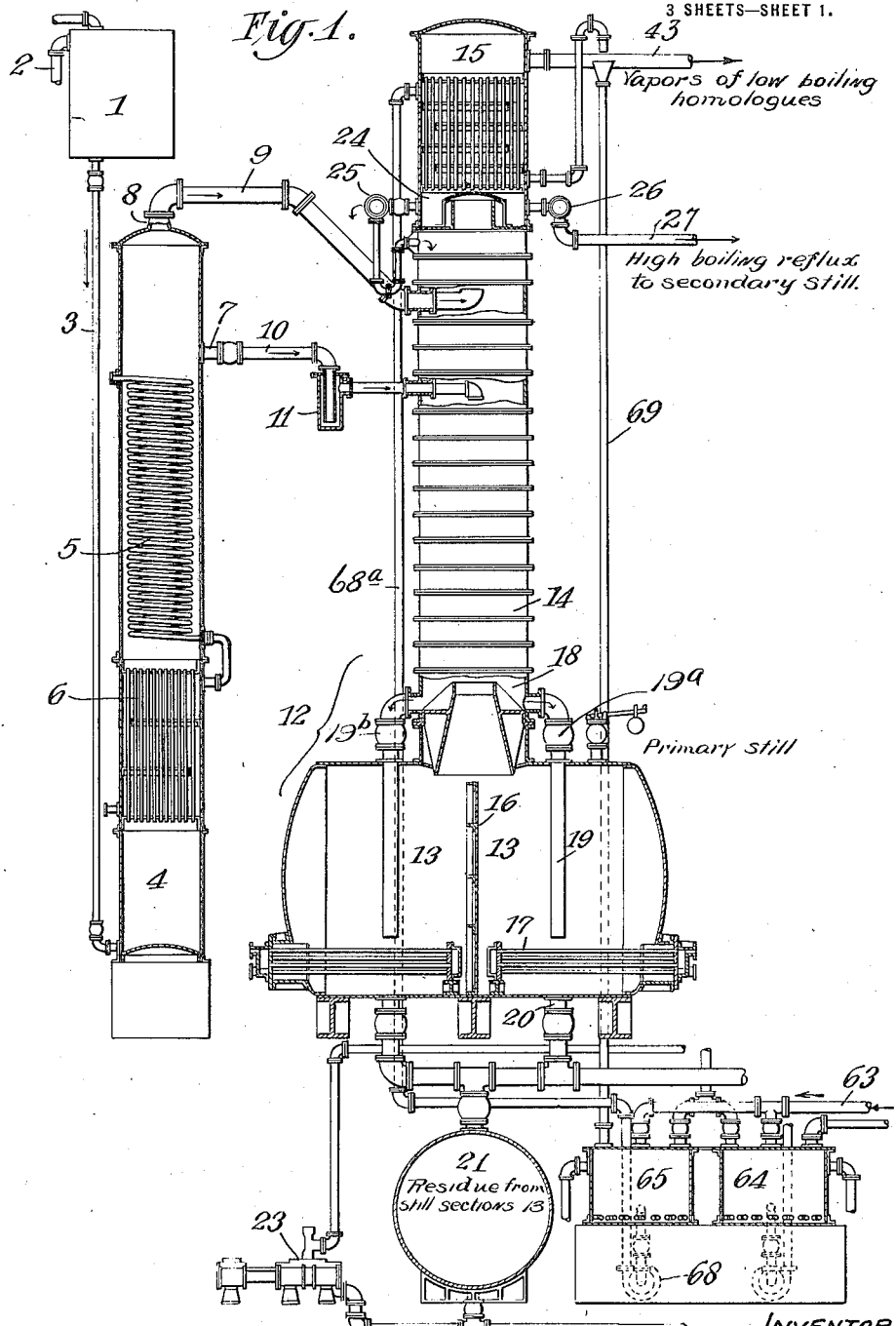

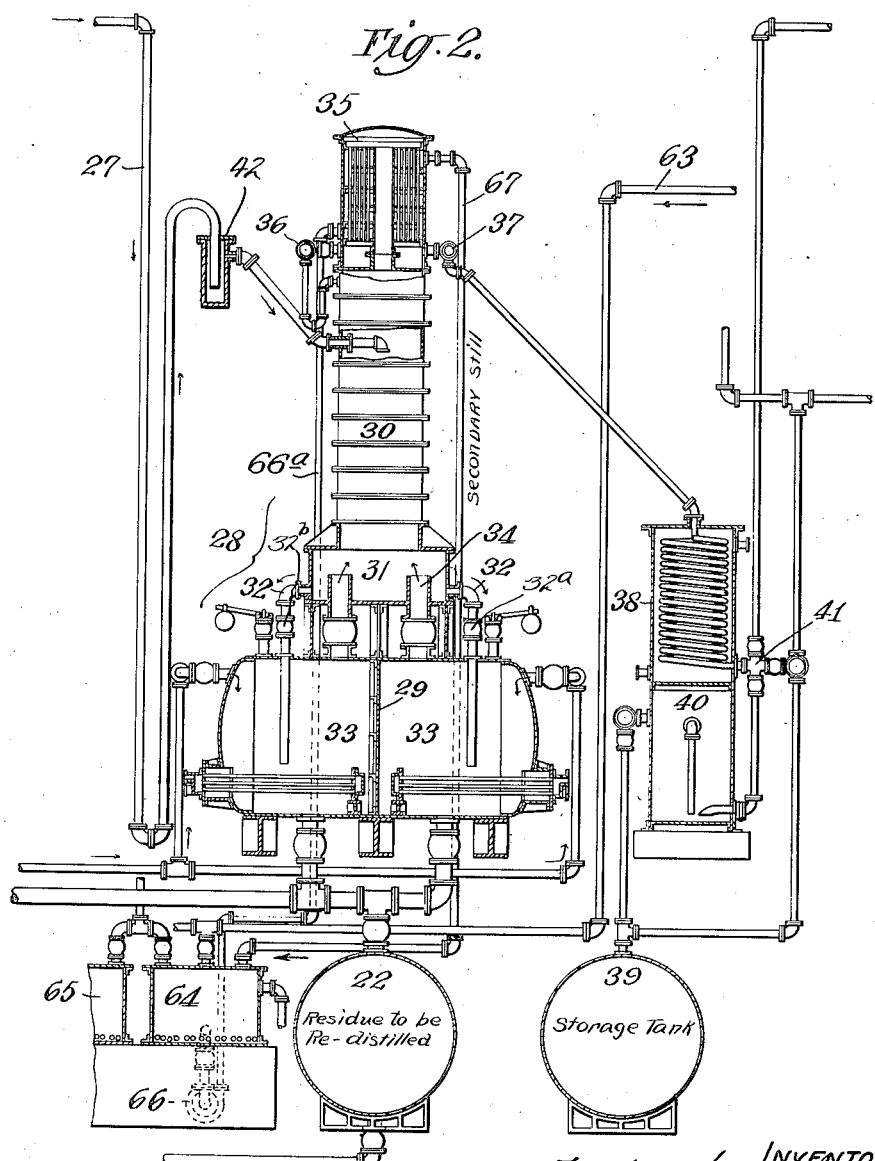

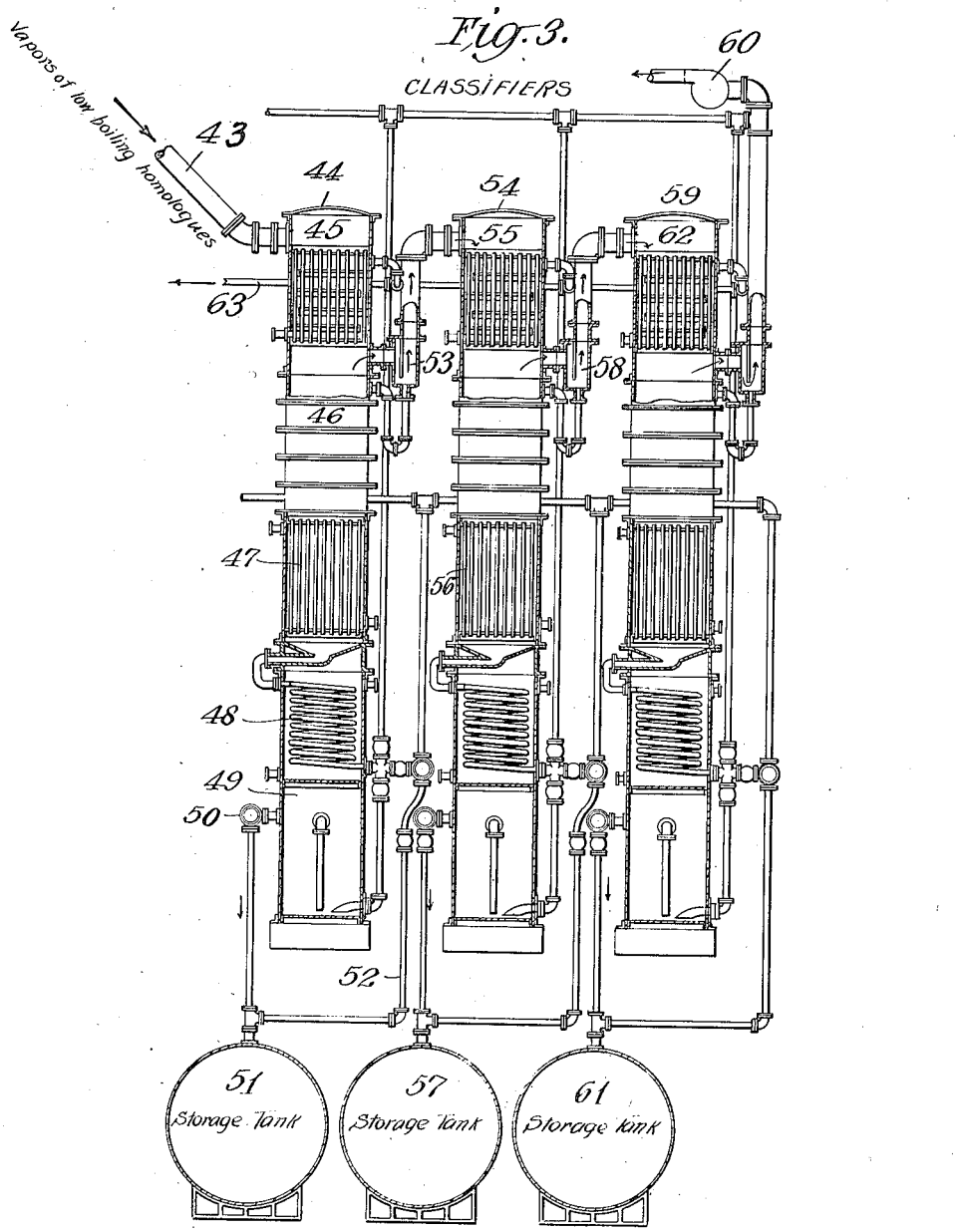

FREDERICK TSCHUDY, OF FAIRFIELD, ALABAMA.

RECOVERY OF CRUDE PRODUCTS FROM BENZOL LIGHT OILS.

1,348,606.  Specification of Letters Patent.  Patented Aug. 3, 1920.

Application filed July 5, 1917. Serial No. 178,611.

*To all whom it may concern:*

Be it known that I, FREDERICK TSCHUDY, a citizen of the United States, residing at Fairfield, in the county of Jefferson, State of Alabama, have invented a certain new and useful Improvement in the Recovery of Crude Products from Benzol Light Oils, of which the following is a specification.

In the recovery of the crude benzol homologues from benzol light oils the light oils are usually distilled by driving off the lower boiling homologues first so that the first crude product is crude benzol. When all the vapors producing crude benzol are driven off, the temperature in the still is raised to produce the second product,—crude toluol, and the process of raising temperatures is continued until all the desired crude products are driven off; when the residue is drained from the still, a new charge is run in and the process repeated. In this process the vapors are taken off through a reflux cooler or dephlegmator in which the higher boiling constituents are condensed and returned to the still. It is evident that the higher boiling homologues being thrown back on the charge at a temperature considerably lower than the mass in the still body will affect the temperature of this mass as well as the temperature of the vapors arising from the mass through the still column. While the process of rectification going on in the still column requires a variation in temperature of the partly rectified material returning to the still, yet in the present manner of operation, this difference is entirely too great for the reason that the amount of back-flow or reflux is out of all proportion to the actual requirements of rectification. This surplus reflux consequently retards the speed at which the homologues may be driven off and requires an additional amount of heat energy in revaporizing the surplus reflux over and over again.

In some distilling systems this drawback is overcome to some slight extent by driving off two of the homologues simultaneously; that is, crude benzol and crude toluol are driven off as one distillate and on redistillation into finished or pure product are separated in the manner previously alluded to.

Continuous distillation has been attempted by several methods, yet in each instance the homologues are either redistilled in separate stills or taken off in groups and re-separated in the finishing process.

One of the advantageous features of my improvement is the reversal of the ordinary process. That is to say I distil the mass in the primary still at the highest required temperature and fractionate the vapors by suitable dephlegmation and heat control. The process is continuous and the primary still is operated without interruption or change in distilling temperature. Only vapors of the lower boiling homologues are treated by dephlegmation, while the higher boiling constituents are redistilled from the reflux of the primary still and are separated in a secondary still which may, if required, be operated under vacuum or by the use of live steam. Various other features of advantage are referred to in detail hereinafter and defined in the claims. The accompanying drawings illustrate an apparatus in which all the novel features of the invention may be practised.

The drawings are more or less diagrammatic and represent separate parts of an apparatus through which the products under treatment are or may be successively passed; the figures being partly in elevation and partly in vertical section.

Figure 1 illustrates the primary still and adjacent parts;

Fig. 2 illustrates the secondary still, and

Fig. 3 a group of classifiers.

The light oil, recovered in the usual way, is pumped to a gravity feed tank 1 which has an overflow 2 back to the light oil storage tank to take care of possible fluctuations. From this feed tank a gravity line 3 leads to a preheater 4, preferably heated by the debenzolized wash oil leaving the separating still used for the recovery of light oil or by steam. The heating medium enters the preheater near the top and flows counter-current to the light oil through a coil 5 which discharges into tubular heater 6 so that the light oil is brought into contact with the radiating heat by being split up into a large number of small streams.

The heating medium leaves the preheater at the bottom of the tubular heater, while the preheated light oil flows off near the top at a temperature of about 130 degrees C. through connection 7. The flow of oil is regulated by a valve adjacent to connection 7. The temperature to which the light oil is preheated will release a large amount of vapor containing parts of all lower boiling homologues. These vapors accumulate in the chamber on top of the preheater and over the level of the preheated light oil, and leave at sufficient vapor tension the preheater at 8 from which these vapors are conducted to the column of the primary still, through line 9.

The preheated oil flowing from the preheater through line 10 passes through a seal pot, 11, to a rectifying column of primary still 12 and falls through the successive still sections into the still body, 13. In its downward travel the light oil is gradually heated up by the vapors ascending from the still body and gives off some of its higher boiling vapors. At the bottom of the rectifying column there is a chamber from which the light oil may be diverted to either compartment of the still body. Should this compartment for any reason be flushed, the overflowing light oil will fall into the still body without interrupting the distillation process to any degree.

The primary still consists of the still body 13, the rectifying column, 14, and the reflux condenser or dephlegmator, 15. The still body may be of any shape or design, a preferential form being shown on our drawing consisting of a large drum. This drum must be of such dimensions as to accommodate a rather appreciable quantity of light oil or residue as the case may be, and as will be hereinafter explained. The partition 16 may be made so that the two compartments communicate at the top of the partition wall as shown in cases where indirect or direct steam is used for distillation without vacuum, or the wall may be made solid as hereinafter referred to if the process is subjected to vacuum.

In the bottom of the body section 13, the distilling coils 17, for live and direct steam are placed, one coil in each section. One section of the still body is filled with preheated light oil about $\frac{3}{4}$ of its capacity when the process is started and the heating coil 17 of that section is put in operation. As soon as the distillation process gives off vapors and reflux as later referred to, the light oil feed pipe 10 is opened and the process becomes continuous. A steady flow of preheated and partly rectified light oil consisting of the heavier boiling homologues flows from chamber 18, to the section 13 under operation through valve 19$^a$ and pipe 19, the valve 19$^b$ closing off for the other section which at this time is at rest. The temperature maintained in the operating section is kept at such height as the homologues desired may require. The higher boiling homologues are driven off in this section containing all the lower boiling constituents and since the continuous flow brings continually new material, there will accumulate in this section all the high boiling residue not driven off by the distillation temperature. A gage glass in the still body will indicate the gradual increase of the residue and when this reaches about $\frac{2}{3}$ of the capacity of the section, the operating section is closed off by valve 19$^a$ on seal pipe 19 and the process continued on the other section of the still body which has been gradually filled for operation during the period of the distillation in the first section.

The steam is left in the first section for some time in order to drive off the last particles of distillate from the accumulated residue and is then shut off.

The residue in the first section is now drained off the bottom through nozzle 20 and run into residue tank 21 or led, if redistillation is required, to the tank for heavy homologues 22 (Fig. 2), to which reference will be made later on.

Tank 21 is connected to a pump 23, for the purpose of filling the secondary still in which the further distillation of the residue is accomplished as specified later on. The section 13 of the primary still 12 is now ready again for a new charge in the process repeated as explained. The vapors liberated in the body of the still ascend through a rectifying column of the usual type and meet the vapors liberated from the preheater 4, through line 9 in the upper part of the rectifying column and beyond the point of entrance of the preheated light oil through line 10. The combined vapors pass a number of still sections for further rectification and from thence reach the reflux condenser 15. Hot water of the required temperature from sources referred to later on is used in this condenser. All vapors over 110 degrees C., are condensed in this dephlegmator and the condensate over 110 degrees C. falls back into chamber 24. A backflow 25 returns a certain quantity of this high boiling condensate to the rectifying column 14 for the purpose of rectification of the vapors. The majority of the high boiling reflux passes through overflow 26 to a gravity feed line 27 (Fig. 2) and through a deep seal in this line to secondary still 28.

The secondary still 28 is similar to, but smaller in capacity than, the primary still, but, since this still is usually operated under vacuum, the center partition 29 closes the two sections of the still body from all connection with each other. The method of operation in the secondary still is essentially the same as described for the primary still. The reflux high boiling condensates enter the rectifying column 30 through gravity line 27 and flow downward through the several sections of the column, countercurrent to the rising vapors, into distributing chamber 31, from which they overflow through valves 32ª, 32ᵇ and lines 32 to either section 33 of the still body as the operation may require.

The vapors arising from chambers 33 ascend through risers 34 and thence through the still column 30 to dephlegmator 35. The correct distillation temperature of the product required is maintained in this dephlegmator by hot water from sources hereafter described.

The condensate recovered by the dephlegmator 35 in the secondary still is the lower boiling fraction of the high boiling constituents of the light oil. Thus, if material boiling between 110 and 130 degrees or higher is charged to this still the fraction of light solvent naphtha is condensed in the dephlegmator. This fraction may be taken off as vapor in the top of the dephlegmator, a process not shown in the drawing, and condensed in the usual manner in a separate condenser, or by proper regulation of the still temperature by steam pressure control the dephlegmator may be used as a condenser as shown on drawing. This latter case applies where light solvent naphtha only is desired, while the other method is used when both light and heavy solvents are desired.

From the dephlegmator bottom a backflow 36 brings a certain quantity of the condensate back to the still columns for the purpose of rectification. The majority of the condensate runs through overflow 37 to cooler 38 from where it may be taken off direct to storage tank 39 or taken there through a water compartment 40 as conditions may demand.

Vacuum is applied through cooler 38 at point of outlet 41 from coil and before the water compartment, which is used in case live steam is applied instead of indirect steam and vacuum. If vacuum distillation is applied, the vacuum is broken by vacuum breaker 42.

If light solvent naphtha only is desired, the accumulated residue in the respective still section is drained to residue tank 21 and mixed with the residue from the primary still. If both light and heavy solvents are required, the distillation is either continued in the still with the accumulated residue at the required temperature for the high boiling solvent or the residue may be drained to tank 22 and redistilled when a sufficient amount has been accumulated or mixed with residue from the primary still as previously alluded to. If two solvents are required, two secondary stills would be required if the process must be continuous in its entirety. This scheme is not shown on the drawings, as the requirements of this case are very problematical and the still and condenser very small.

The main product of the primary still 12,—vapors of the homologues boiling below 110 degrees C., leave the dephlegmator 15 through line 43 (Figs. 1 and 3) and are brought to a series of classifiers and condensers to be separated into the required products.

The first classifier 44, receives vapors of products boiling from 110 degrees C. downward, which, for the sake of illustration, are classified as follows: 110 degrees C. to 90 degrees, crude toluol; 90 degrees to 80 degrees, crude benzol; and below 80 degrees; first run and waste vapors.

In classifier 44 the vapors pass downward through dephlegmator 45. The temperature of this dephlegmator is regulated so that only the product ranging between 90 degrees and 110 degrees C. is condensed, while the vapor tension is maintained for the rest of the vapor products. The condensate falls through into the sections of a rectifying column 46 and passes downward to a reheater 47. Here the condensate is split up into a large number of fine film streams flowing downward on the tubes of the reheater. The temperature of the reheater is controlled so that all homologues boiling below 90 degrees C. are evaporated. The condensate not evaporated but freed from the lower boiling constituents is collected at the bottom of reheater 47 and flows downward, through a water cooled coil 48, to a water compartment 49, if direct steam is used, and thence through overflow 50 to storage tank 51. If vacuum is used for the distillation, the cooled condensate flows from the coil 48 through the line 52 direct to storage tank 51. The uncondensed vapors in dephlegmator 45 together with the regenerated vapors from the reheater 47, leave the classifier at trap 53. It is evident that for the movement of the vapors forward the vapor tension must be that of the highest temperature of the next following homologues to be extracted. To accomplish this, besides regenerating the condensate passing down, is the purpose of the reheater 47.

The vapors leaving the classifier 44, flow now to classifier 54, where the process of distillation previously described for classifier 44 is repeated at the temperature required for the next homologue at 90–80 degrees C. Dephlegmator 55 condenses out the product boiling between 90–80 degrees C., and reheater 56 reëvaporates all condensate below 80 which may pass downward and maintains the required vapor tension for the next step of condensation. The finished condensate is led to storage tank 57 in the manner described for classifier 44. The vapors freed from the homologues boiling from 90–80 degrees C. leave through trap 58 and are conducted either to classifier 59, or, if no further distillation is desired, and classifier 59 not used, they are sucked off at low pressure by blower 60 and conducted to the gas main for finished surplus gas, but are not let into the air as is common with existing methods.

The functions of classifier 59 are identical with those of 44 and 54, excepting that the product recovered boils below 80 degrees C. This product is collected in storage tank 61.

In the process described, the proper function of certain dephlegmators depends upon water of a certain specified and constant temperature. Since the process of condensation in stages as described requires cold water for the low boiling products, this water during the process is partly heated up by exchange of heat with the vapors. The water overflows on dephlegmators 45 and 55 and 62 are connected to water main, 63 (Figs. 3 and 2) which leads the partly heated water to preheater tanks 64 and 65 (repeated in Figs. 1 and 2). Each preheater serves one dephlegmator. In the case shown, 64 serves dephlegmator 35 (Fig. 2) of the secondary still and 65 the reflux cooler of the primary still 12 (Fig. 1). These preheaters are supplied with the waste water from the low temperature dephlegmators continuously and are provided with a float waste overflow line (not shown) which by-passes the colder supply water should the preheater be filled to capacity. Each preheater has a steam coil by which the correct temperature of the respective hot water supply is maintained through the medium of an automatic temperature control. The heated water from tank 64 is forced by pump 66 through pipe 66ᵃ to dephlegmator 35 (Fig. 2) and overflows through line 67 back to tank 64 for reheating. Pump 68 forces water from tank 65 through pipe 68ᵃ to dephlegmator 15 (Fig. 1) whence the water returns by line 69 to the preheating tank.

While the foregoing description illustrates the intents and purposes of the method, other manners of operation can be resorted to and the apparatus may readily serve for the prevalent method of distilling by stages. The body of the primary still 12 may be charged as previously described or on both compartments simultaneously and the lowest boiling product be driven off with the first heat. In this case, the overflow 26 is closed and all backflow returned through 25. Dephlegmators 45 and 55 (Fig. 3) will be slightly heated by dry heat from reheaters 47 and 56 to maintain a temperature at which no distillation of the lowest temperature products takes place, and dephlegmator 62 will condense this first product. This distillation could be accomplished by gradually feeding the light oil to the primary still body until the proper capacity has been reached, at which time the first product would be driven off and the distillation of the second product would take place. This product would be condensed in the dephlegmator 55. The next product would be handled in a manner similar to that for the two previous products, explained, and condensed in the dephlegmator 45. In this case, overflow 26 (Fig. 1) would be opened and the distillates accumulated in the body of the secondary still 28 (Fig. 2). The residue of both stills 12 and 28 would be treated as previously described.

What I claim is:

The process of recovering crude products from benzol light oils which consists in continuously distilling the mass in a primary still at the highest required temperature to drive off all the vapors of the low boiling homologues and fractionating the vapors therefrom and redistilling in another still the high boiling constituents of the vapor that are liquefied by such fractionating and treating the vapors of the lower boiling homologues that are uncondensed by such fractionating directly by dephlegmation in successive stages to recover the desired products.

In witness whereof I have hereunto signed my name.

FREDERICK TSCHUDY.